(No Model.)
W. A. PHILLIPS.
APPARATUS FOR MOVING CARS AROUND CURVES OF CABLE RAILWAYS.
No. 386,654. Patented July 24, 1888.
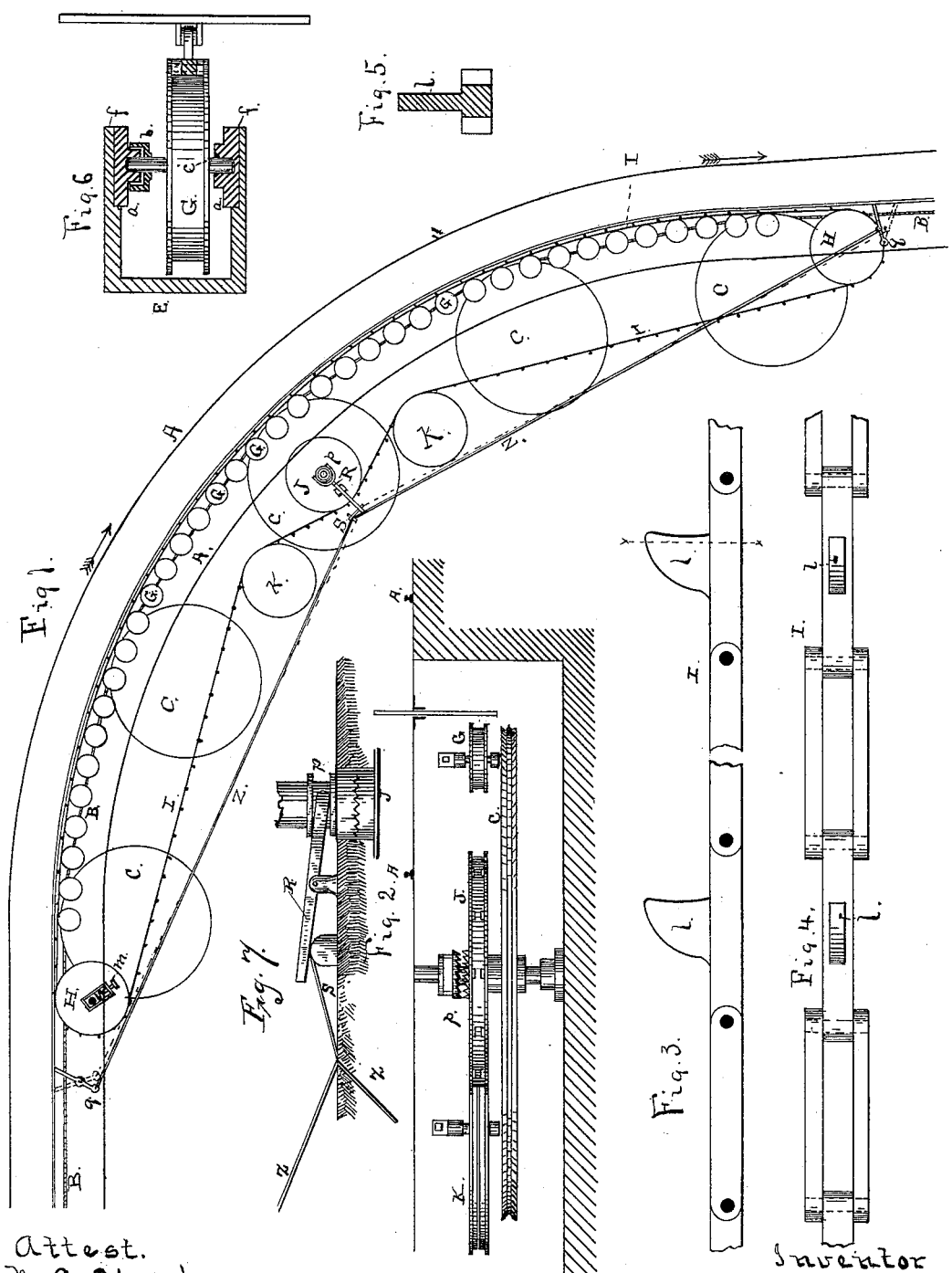
Attest.
N. A. Clark.
M. J. Clagett.
Inventor
William A. Phillips.
by Geo. W. Dyer,
Atty

UNITED STATES PATENT OFFICE.

WILLIAM A. PHILLIPS, OF SAN FRANCISCO, CALIFORNIA.

APPARATUS FOR MOVING CARS AROUND CURVES OF CABLE RAILWAYS.

SPECIFICATION forming part of Letters Patent No. 386,654, dated July 24, 1888.

Application filed December 23, 1882. Serial No. 80,019. (No model.)

*To all whom it may concern:*

Be it known that I, WILLIAM A. PHILLIPS, of the city and county of San Francisco and State of California, have invented an Improved Method and Apparatus for Moving Cars Around Curves in the Endless-Cable System of Propelling Cars; and I do hereby declare the following to be a full, clear, and exact description thereof, reference being had to the accompanying drawings.

My invention relates to the curved portion of the track in a cable railroad, and to the mechanism for supporting and carrying the main rope and for propelling the cars around the curve.

It consists in the employment of a supplemental endless chain, rope, or cable, which simply extends the length of the curve and is supported and carried by an independent system or series of small pulleys, and which is connected with one of the pulleys of the main cable by a connecting and disconnecting clutch, so that it can be set in motion when desired by power derived from the main cable. One side of this supplemental cable is carried upon a system of small pulleys, close to and parallel with the slot in the tube, and the cable is provided with legs or projecting arms at intervals apart, which serve to engage with the shank of the gripper and push it around the curve after the gripper has been detached from the main cable.

Automatic devices are provided, by which the gripper-shank is made to connect and disconnect the clutch, so as to set the supplemental cable in motion or throw it out of action at the proper instant, all as hereinafter more fully described.

Referring to the accompanying drawings, in which Figure 1 is a plan view of the curve of the railroad, Fig. 2 is an elevation of the clutching device. Figs. 3 and 4 are detail views of the supplemental cable. Fig. 5 is a section through *x x*, Fig. 3. Fig. 6 is a detail view of the small pulleys carrying the supplemental cable. Fig. 7 is a perspective view of the wedge and connections thereto.

Let A A represent the two rails of a street or other railway.

B is the main cable by which the cars are propelled along the straight track.

At the curve I make a wide excavation extending the full length of the curve, and in this excavation I mount a number of large horizontal pulleys C C C at intervals apart, which may be placed entirely independent of their relation to the slot *d* in the tube; but usually I will mount them on the concave side of the slot with their peripheries close to the slot, as shown. The particular arrangement of these pulleys for supporting the main cable will depend on circumstances, as their only purpose is to support the main rope and carry it around the curve with as little friction as possible. The main cable will then stretch in a direct line from one pulley to the other, and pass from the last horizontal pulley at each end of the curve directly through the straight tubes upon the usual vertical supporting-pulleys. On the concave side of the slot I secure to the under side of the tube inside of the excavations a continuous metallic box, E, (shown more clearly at Fig. 6,) with its open side next to the slot. This box extends the full length of the curve. At short intervals apart I make grooves *f* in the upper and lower sides of the box, so that each groove in the upper side will be directly above a similar groove in the lower side. These grooves serve to receive the bearings of small horizontal pulleys G.

Both the upper and lower bearings of each small pulley G is a block, *a*, which is provided with a socket to receive the end of the pulley-shaft, and these blocks slide into the grooves *f* in the box after they have been adjusted to the ends of the shaft. To provide for lubricating these bearings or journals, I make each upper block with a projection or hub on its under side, in the center of which the socket for receiving the journal is made. Underneath and around this hub or projection I secure a cup, *b*, which is somewhat longer in diameter than the hub. The space between the rim of the cup and the side of the hub I fill with oil before adjusting the pulley in the grooves, thus providing a quantity of lubricant that will feed itself to the journal without requiring attention for a long time. The lower end of the shaft steps in the socket in the lower block, and a cup-shaped concavity, *c*, is made in the block around the shaft, which contains oil for lubricating the lower bearing.

These pulleys, as above stated, are placed in the box at short intervals apart, entirely around the concave side of the slot, thus forming a continuous line of small pulleys, the outer peripheries of which are close to the slot.

At each end of the excavation I mount a medium-sized horizontal pulley, H, in the same plane with the line of small pulleys G, and these pulleys form the end pulleys around which my supplemental endless chain or cable I passes.

The main cable B travels continuously, and consequently its supporting-pulleys C are continuously rotating. I can therefore provide for driving this supplemental chain or cable I from either of the pulleys C. I prefer to employ the pulley nearest to the middle of the curve as the driving-pulley. To do this I place a loose pulley, J, on its shaft above the pulley C and provide a clutch-coupling, p, (shown at Fig. 2,) for connecting the rotating shaft with the hub of the loose pulley J, so that the pulley J will only be rotated when the coupling is connected with it.

On each side of the pulley J, I mount other horizontal pulleys K K in such relation to the pulley J that a chain or cable passing between the two pulleys K will be strained against one side of the pulley J.

The supplemental cable I, I prefer to construct of a series of connected links, so as to form a chain-cable, (shown at Fig. 4,) and on each alternate link or farther apart, if desired, I secure or form a projecting leg or arm, l, which will project across the slot when it is moving opposite to and against the line of small pulleys. This endless supplemental chain or cable will then pass around the end pulley, H, at each end of the excavation, along, in front, and against the line of pulleys G, below the slot and over and under the pulleys K K J, as represented at Fig. 1.

One of the end pulleys, H, I mount on a movable bearing, and I provide a set-screw, M, for shifting its position in order to take up the slack of the chain and tighten it upon the driving-pulley J.

The clutch-coupling p, which connects and disconnects the rotating shaft of the pulley C with the supplemental driving-pulley J, I operate automatically by means of suitable connections with levers q q at each end of the curve, and the ends of these levers project across the slot, so that they are operated by the passage of the gripper-shank of the car.

R is the forked lever, which shifts the movable part of the clutch on the shaft into and out of gear with the corresponding part on the hub of the pulley J. This lever is pivoted at its middle to the under side of the street or cover of the excavation, and a wedge or inclined plane, S, is arranged to move under its outer end, so as to throw the clutch in or out according to the direction in which the wedge or inclined plane is moved. A rope or cord, Z, connects this wedge with each of the levers q at each end of the curve.

The cars move in one direction only on each track, so that when a car approaches the curve it trips the lever q at the approach end and connects the coupling p with the pulley J, so that the supplemental cable is set in motion. At the same instant, or possibly before the shank of the gripper strikes the lever q, the gripper is detached from the main cable by the engineer or driver leaving it free. The shank of the gripper is then caught by one of the legs or projecting arms on the supplemental cable and pushed along by it around the curve, carrying the car with it until the car passes the curve at the opposite end. Just as the car passes from the curve the shank of the gripper comes in contact with and moves the opposite lever q, thus shifting the coupling out of gear with the pulley J and stopping the movement of the supplemental cable until another car reaches the curve.

The speed at which the supplemental cable moves is governed by the size of the pulley J. I prefer to make the pulley J much smaller than the pulley C, so that the supplemental chain will move slower than the main cable. This arrangement is adapted for any and all curves, switches, and turnouts, where a deflection or bend in the road renders it impracticable to move the cars by the main cable. In adapting it to cross-roads and switches where one or more main cables cross each other, I make the excavation deeper, and instead of placing the supplemental cable above the main cable I place it underneath and substitute short upward-projecting arms for the arms or legs l, so that the same operation occurs, only the arms that push the gripper project upward instead of outward.

There is very little wear on the supplemental cable, as it only moves when a car is passing around the curve, and even then its motion is so slow that there is no great strain upon it. The arrangement of the pulleys also leaves sufficient spaces between them for the street-supports to pass through, and although the excavation is larger than that required for the simple tube yet no difficulty need be encountered in making a permanent and substantial street above it.

Having thus described my invention, what I claim, and desire to secure by Letters Patent, is—

1. In the system of propelling cars by means of an endless rope or cable moving in an underground slotted tube or tunnel, the improvement in passing the cars around curves, consisting in the combination of the main cable B, carried around the curve on large horizontal pulleys C C regardless of its relation to the slot in the tube, with a supplemental endless chain or cable, I, having legs or arms l, the line of small pulleys G supporting one part of said chain or cable parallel with the slot through which the gripper-shank passes, and the driving mechanism connected to the opposite part of said chain or cable and automatically set in motion and thrown out of motion by the pressure of the gripper-shank against a lever, q, substantially as described.

2. In an apparatus of the character described, the combination, with the main cable B, carried around the curve on large horizontal pulleys C C, of the supplemental endless chain or cable I, having legs or arms l, the line of small pulleys G, supporting one part of said chain or cable, the loose pulley J, supporting another part of said chain or cable, and the clutch-coupling p, mounted upon the same shaft with said pulley J and operated by the pressure of the gripper-shank against levers which are located at each end of the curve and have intermediate connections with said clutch-coupling, substantially as and for the purposes set forth.

3. In an apparatus of the character described, the combination, with the main cable B, carried around the curve on large horizontal pulleys C C, of the supplemental endless chain or cable I, having legs or arms l, the line of small pulleys G, supporting one part of said cable parallel with the slot through which the gripper-shank passes, the two pulleys H H, for supporting said chain or cable at the ends of the curve, the loose pulley J, combined with the clutch-coupling p, mounted on the shaft of one of the pulleys C for supporting the opposite side of the said chain or cable at a point about central between the two pulleys H H, the two pulleys K K, for pressing the said chain or cable against one side of the loose pulley J, and mechanism for throwing said loose pulley into and out of action by the pressure of the gripper-shank against levers connected with such mechanism, substantially as and for the purpose set forth.

4. In an apparatus of the character described, the combination, with the main cable B, carried around the curve on large horizontal pulleys C C, and the supplemental endless chain or cable I, supported by the line of small pulleys G, and the pulleys H H and K K, of the loose pulley J and the clutch-coupling p, mounted on the shaft of one of said large pulleys C, the engaging forked lever R, pivoted at the center, the wedge or inclined plane S, arranged to move under the outer end of said lever, and a rope or cord, Z, connected to this wedge and to levers q at each end of the curve, substantially as and for the purpose set forth.

5. In an apparatus of the character described, the line of pulleys G, for supporting the supplemental chain or cable I, all arranged in a continuous metallic box, E, provided wih grooves f, combined with upper bearing-blocks, a, and cups b, and lower bearing-blocks, a, provided with cavities e, substantially as and for the purpose set forth.

W. A. PHILLIPS.

Witnesses:
   JOHN D. GAGNON,
   JNO. L. BOONE.